United States Patent
Thomas

(10) Patent No.: US 8,230,415 B1
(45) Date of Patent: Jul. 24, 2012

(54) ON-DEMAND ADVERTISING OF SOFTWARE PACKAGES

(75) Inventor: Christopher N. Thomas, Watsonville, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1533 days.

(21) Appl. No.: 11/685,374

(22) Filed: Mar. 13, 2007

(51) Int. Cl.
*G06F 9/44* (2006.01)
*G06F 9/445* (2006.01)

(52) U.S. Cl. ........ 717/173; 717/168; 717/171; 717/178; 717/174; 717/176

(58) Field of Classification Search .................. None
See application file for complete search history.

(56) References Cited

U.S. PATENT DOCUMENTS

| | | | | |
|---|---|---|---|---|
| 2005/0108688 | A1* | 5/2005 | Lucovsky et al. | 717/127 |
| 2007/0061800 | A1* | 3/2007 | Cheng et al. | 717/170 |
| 2007/0226782 | A1* | 9/2007 | Sato et al. | 726/4 |

OTHER PUBLICATIONS

"Windows Installer Options for DameWare MSI Files", Nov. 2004, DameWare.*

* cited by examiner

*Primary Examiner* — Lewis A Bullock, Jr
*Assistant Examiner* — Mark Gooray
(74) *Attorney, Agent, or Firm* — Shumaker & Sieffert, P.A.

(57) ABSTRACT

A network system includes an access control device and a client device. The access control device provides access to an enterprise network using a virtual private network (VPN) and provides a software update package to the client device. The client device includes an operating system that maintains a user context for a user having restricted privileges and a system context having elevated privileges. The client device further includes a user-level setup module, a system-level installation service and a user-level installation service. The setup module, system-level installation service and the user-level installation service interact to provide on-demand advertisement and installation of authorized software update packages on computing devices when needed by the user without requiring action by an administrator.

25 Claims, 3 Drawing Sheets

ON-DEMAND ADVERTISING OF SOFTWARE PACKAGES

TECHNICAL FIELD

The invention relates to computer networks, and more particularly, to installation of software packages on a computing device.

BACKGROUND

Software on a computing device frequently requires updates, (i.e., the installation of software update packages containing new or updated software), to respond to changes in the underlying operating system or hardware, fix errors in the previous software version, or implement additional functionality. Within an enterprise, an administrator may be responsible for managing the installation of these software update packages on end-user devices of an administered network. The software update packages may be of different formats depending on the operating systems of the end-user devices. For example, the software update packages may be Windows Installer Packages ("MSI packages") in the context of the Windows™ operating system, or other software update packages in the context of other operating systems, such as the Mac OS operating system or the Linux operating system.

Frequently, prior to installation of a software update package, the administrator must "advertise" the software update package to the operating system of a given computing device. That is, the administrator must first register the software update package with the operating system and authorize subsequent installation of the software update package by a user having restricted privileges. Once advertised, the restricted user may, upon logging into the computing device, install the software update package with elevated privileges. While this procedure enables the restricted user to install software update packages that the restricted user would not normally be able to install due to the user's restricted privileges, the process has certain limitations. For example, the process requires that the administrator must know the particular software update package to be installed and must have an electronic copy of the software update package in order to advertise it to the operating system. Moreover, the administrator must have access to the computing device to advertisement of the software update package.

Administrator access to the computing device becomes more problematic when the administrator is responsible for updating software residing on computing devices connected to the administered network via a virtual private network (VPN). In this instance, the administrator may require access to a computing device residing hundreds or thousands of miles away from the administered network in order to determine whether a software update package is needed and, if so, to advertise the software update package to the operating system.

Moreover, although the administrator may be able to remotely access and advertise the software update package on the computing devices using the VPN, the restricted user typically is still forced to only install the registered software update package with elevated privileges, i.e., within the system context, or as a "SYSTEM" user, of the operating system. For complete installation, however, some software update packages, such as some MSI packages, require that the user install them under a user context of the operating system in order to preserve user-specific details. Thus, despite remote advertisement, the restricted user may not install these MSI packages that require installation under the user context, or if installed using conventional advertisement techniques, user-specific installation details may be lost.

SUMMARY

In general, the invention is directed to techniques for implementing on-demand advertisement and installation of authorized software update packages on computing devices. In this instance, the term "on-demand" advertisement means advertisement when needed by the user. For example, on-demand advertisement and installation of authorized software update packages may occur upon user access to an enterprise network. The techniques may allow a remote client device of an enterprise virtual private network (VPN), for example, to determine whether a software update package is required when a user logs into the enterprise network using the client device. If so, an authorized software update package is dynamically advertised to the operating system of the remote client device to indicate the software package may be installed by the user. The techniques may allow the remote client device to advertise, or register, software update packages with an operating system of the remote client device and install the software update packages in a manner that preserves user-specific installation details.

As one example, a VPN access service running on the client device perform on-demand advertisement of an MSI software update package to a Windows™ operating system when the user accesses and is authenticated by the enterprise VPN. The VPN access service executing on the client device may first determine whether presently installed software on the client device requires meets corporate requirements or, instead, must be updated. If so, the VPN access service may automatically initiate the installation of the software update package by downloading the software update package from an access control device of the VPN.

Once downloaded, an installer service executing within a system context, or as a SYSTEM user, of the operating system that authenticates the software update package to confirm that the software update package was provided by a trusted source. If authentication is successful, the installer service advertises the software update package to the operating system. That is, the installer service registers the software update package such that subsequent installation may occur by the currently logged-in user having restricted privileges. After advertising the software update package, a service executing within a user context of the operating system of the client device may be in turn invoked to install the software update package within the context of the currently logged in user. Because this service executes within the user context of the operating system, the service may install the software update package such that user-specific installation details are preserved.

In one embodiment, a network system comprises an access control device and a client device. The access control device provides access to an enterprise network using a virtual private network (VPN) and provides a software update package to the client device. The client device includes an operating system that maintains a user context for a user having restricted privileges and a system context having elevated privileges. The client device further includes a user-level setup module, a user-level installation service, and a system-level installation service. The user-level setup module executes within the user context and determines whether to update software residing on a client device based on at least one parameter downloaded from the access control device when the user has successfully logged into the VPN. The user-level setup module is configured to automatically download the software update package from the access control device based on the determination. The system-level installation service executes within the system context to authenticate the software update package and verify that the software update package was produced by a trusted source. The user-level installer service executes within the user context to advertise the software update package upon request by the system-level installation service by registering the software update package with the operating system to enable subsequent installation of the software update package. The user-level setup module is configured to direct the user-level installer service to install the authenticated software update package within the client device after the user-level installer service advertises the software update package.

In another embodiment, a method for installing a software update package on a computing device comprises receiving a software update package for a user associated with the computing device, wherein the user has restricted privileges within the computing device. The method further comprises invoking a system-level installation service from a user context associated with the user, wherein the system-level installation service executes within a system context of an operating system of the computing device, and authenticating the software update package with the system-level installation service. The method comprises after authentication, invoking, with the system-level installation service, a user-level installer service executing within the user context to advertise the software update package to the operating system from the user context to enable subsequent installation of the software update package by the user and installing the software update package with the user-level installer service.

In another embodiment, the invention is directed to a computer-readable medium containing storage instructions. The instructions cause a programmable processor to perform the methods described herein.

The techniques described herein may provide a number of improvements over conventional software update package installation techniques. For example, the techniques may avoid the requirement that an administrator pre-register software packages with operating systems of the client devices. As a result, the on-demand installation techniques are not restrict to known and previously registered software packages, but instead allow for on-demand advertisement and installation of future software packages when published by a trusted source. In other words, future software packages published by a trusted source may be installed on the computing device without requiring any additional action by an administrator. Moreover, the techniques may allow the client device to preserve user-specific installation details by enabling the client device to install the software update package from within the user context.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
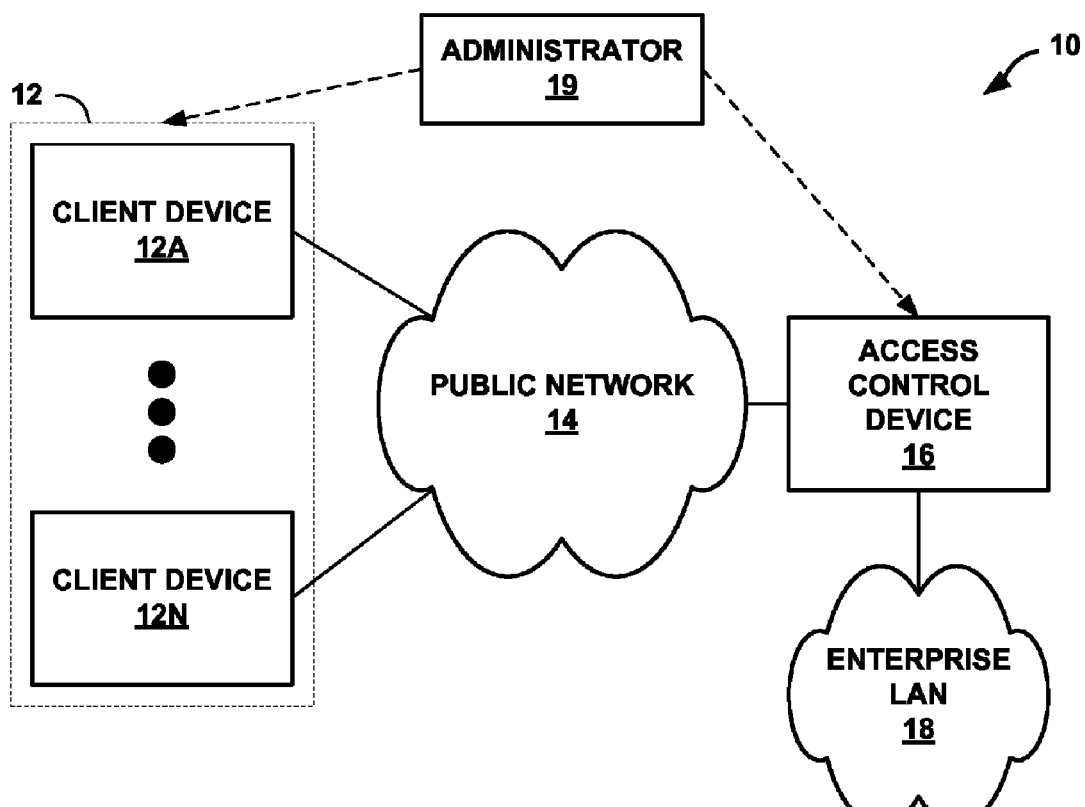
FIG. 1 is a block diagram illustrating a network system in which client devices advertise and install software update packages on-demand in accordance with the principles of the invention.

FIG. 1 is a block diagram illustrating a network system 10 in which client devices 12A-12N receive and install software update packages on-demand in accordance with the principles of the invention. Network system 10 includes client devices 12A-12N ("client devices 12"), a public network 14, an access control device 16, and an enterprise local area network 18 ("LAN 18"). Network system 10 further includes an administrator 19 that may configure client devices 12 and access control device 16, such that it can perform the techniques of the invention, as described below.

"On-demand" advertisement for purposes of the invention means advertisement when needed by the user, such as when a user remotely logs into and accesses LAN 18. That is, client devices 12 download, verify, advertise, and install software update packages as needed without requiring administrator 19 to have previously logged into client devices 12 and advertise (i.e., register) these software update packages for subsequent installation. "Advertise" for purposes of the invention refers to the act of registering a software update package with an operating system of one of client devices 12 for subsequent installation by a restricted user, i.e., a user with restricted privileges. On-demand advertisement may allow client devices 12 to self-determine whether an update is required when accessing LAN 18 and, if so, to advertise and install this update without requiring further action from administrator 15. The software update package includes any software package containing new and/or updated software.

As shown in FIG. 1, client devices 12 are coupled to public network 14, which in turn is coupled to LAN 18 via access control device 16. Each of client devices 12 may be any computing device, such as a personal computer, a laptop, a workstation, a network-enabled wireless device, a personal digital assistant (PDA), a network-enabled cellular phone, or a network ready digital appliance. Public network 14 may comprise any set of one or more interconnected public networks, such as the Internet. Public network 14 may include other conventional network devices, such as routers, media gateways, switches, hubs, and network accelerators, to communicate data between client devices 12, access control device 16, and devices within LAN 18. Public network 14 generally provides few security measures for devices coupled to public network 14, such as client devices 12 and access control device 16, to securely communicate data.

Access control device 16 may comprise any device for restricting access to LAN 18 and facilitating secure communication between remote devices, such as client devices 12, and devices located within LAN 18, such as email servers, document servers, application servers, and network storage drives. An exemplary access control device 16 may comprise one of a secure socket layer virtual private network ("SSL-VPN") device, a conventional virtual private network gateway ("VPN gateway"), and an Internet Protocol security virtual private network ("IPsec VPN") device. For ease of illustration, access control device 16 will be described below in reference to a SSL-VPN; however, the invention may comprise any of the exemplary embodiments listed above. LAN 18 may comprise a local area network, such as those managed and maintained by an organization. Although described in reference to LAN 18, the invention should not be limited strictly to LANs but may include other private networks, such as a wide area network (WAN).

Initially, administrator 19 configures a VPN by installing software on both client devices 12 and access control device 16. In some embodiments, access control device 16 may be pre-configured to support the VPN, and administrator 19 may only have to configure access control device 16 to add VPN users and the like. Client devices 12 typically execute an operating system, such as Windows™ operating system (Windows NT, Windows 98, Windows 2000, and Windows XP), which provides varying privilege levels at which users may interact with the operating system and components of client devices 12. Generally, users operating client devices 12 log into the operating system at a user level, where the operating system creates a process space for the user and provides restricted privileges to the user. For example, a user may log into client device 12A, and receive basic privileges, such as read access privileges, optionally write access privileges, and network access privileges, but not all possible privileges, such as installation privileges, network configuration privileges, and system configuration privileges. These users are referred to herein as "restricted users" because the users do not have the full set of privileges. Further, users who log into client devices 12 may be referred to herein as "remote users" and client devices 12 may be referred to as "remote client devices 12" because client devices 12 are remote from LAN 18.

Once configured, client devices 12 may remotely and securely access LAN 18 via the VPN. In order to access LAN 18, client devices 12 may log into the VPN, where access control device 16 authenticates the user operating client device 12. Upon successful authentication, client devices 12A, for example, may dynamically determine whether an update is required to operate over the VPN. That is, access control device 16 may reference corporate policy information and require client device 12A to install one or more software update packages before allowing client device 12A access to LAN 18. Client device 12A may download parameters and other specifications from access control device 16 in order to dynamically determine whether a software update package is required.

If a software update package is required, client device 12A may automatically download the software update package from access control device 16. Client device 12A next authenticates the software update package to ensure that it installs only those software update packages provide by a trusted source. For example, client device 12A may verify a digital signature of the software update package. Based on the outcome of the software update package authentication, client device 12A then advertises the software update package by registering the software update package with the operating system.

Client device 12A may include an installer service (not shown in FIG. 1) executing within the system context, or as a SYSTEM user, of the operating system to control this authentication and on-demand advertisement of the software update package. That is, upon access and successful login of the current user of client device 12A, user-level software seamlessly invokes the system-level installation service to determine whether a software update package is needed and, if so, to authenticate the software update package.

In turn, the system-level installation service then invokes a software service executing at the user level, i.e., within the user context, to trigger advertisement and installation of the software update package. As one example, the software update package to be installed may comprise a package delineated by an ".msi" extension. At the direction of the system-level installation service, a Windows installer service executing at the user-level advertises the software update package. That is, the Windows installer service executes within a context space associated with the user, or in other words, at the user level and acts as a proxy for the system-level installation service to advertise the software update package. The user then interacts with the Windows installer service to install the software update package on client device 12A. In this manner, system-level authentication is performed, and user-level on-demand advertisement and installation is performed to preserve user-specific installation details.

Because the Windows installer service executes at the user level, client device 12A may install the software update package at the user level, thereby allowing client device 12A to preserve user-specific installation details that would be lost in instances where a system level service installed the software update package. Further, because client device 12A may advertise the software update packages on-demand, administrator 19 need not log into each of client devices 12 to advertise the software update package, or inform client devices 12 of the software update package, prior to client devices 12 installing each software update package. In this manner, the techniques of the invention may facilitate installation of software update packages across a VPN through on-demand advertising of software update packages without requiring further administrative action. Moreover, in this way the on-demand installation techniques are not restrict to known and previously registered software packages, but instead allow for on-demand advertisement and installation of future software packages when published by a trusted source. In other words, future software packages published by a trusted source may be installed on client devices 12 without requiring any additional action by administrator 19.

Figure 2:
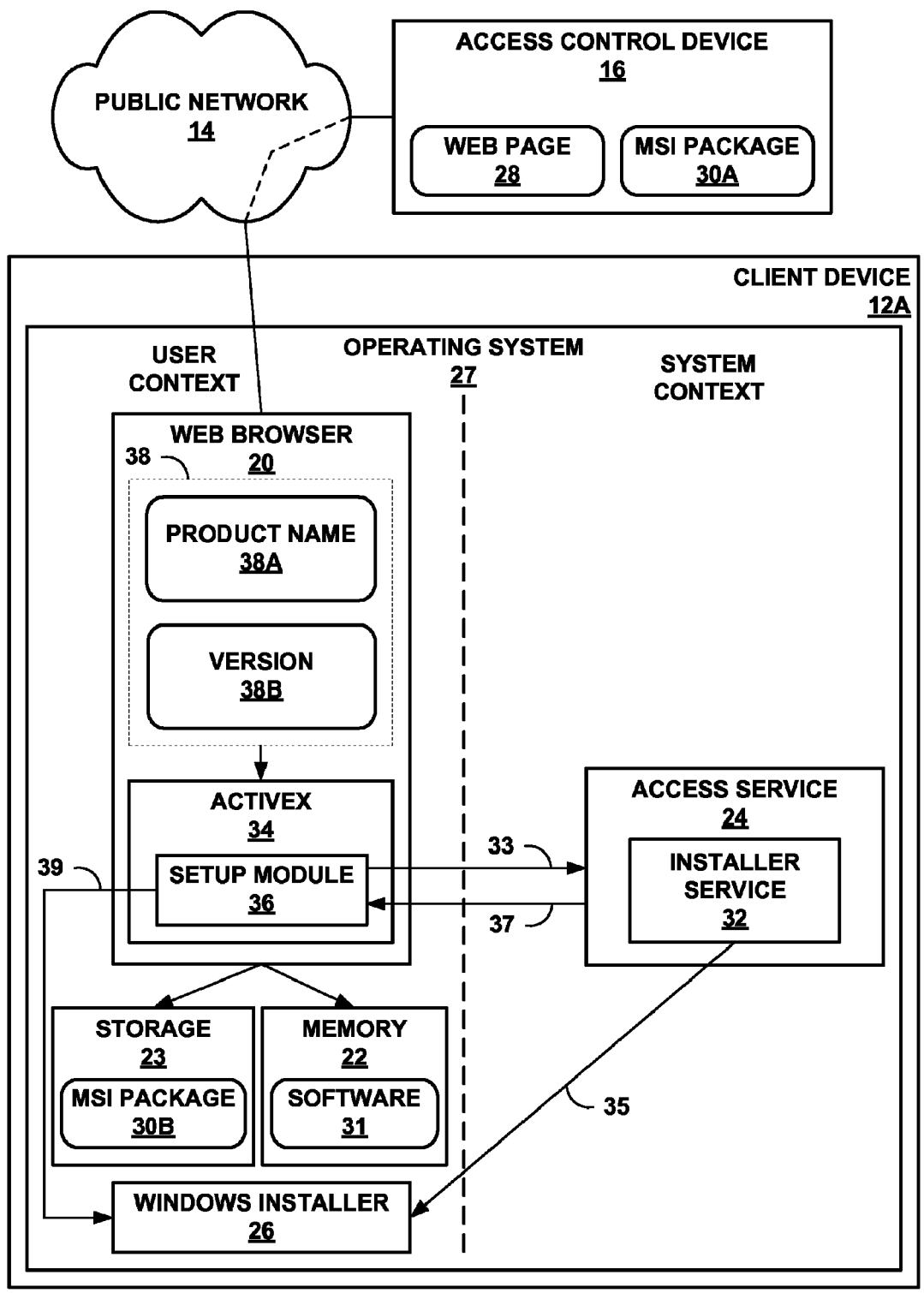
FIG. 2 is a block diagram illustrating in more detail an exemplary embodiment of one of the client devices and an access control device of FIG. 1 that operate in accordance with the principles of the invention.

FIG. 2 is a block diagram illustrating in more detail an exemplary embodiment of one of client devices 12 of FIG. 1 (i.e., client device 12A in this example) and access control device 16 that operate in accordance with the principles of the invention. In this example, client device 12A includes a web browser 20, a memory 22, a storage location 23, an access service 24, a Windows installer 26, and an operating system 27. As shown in FIG. 2, operating system 27 provides an operating environment that includes a user context and a system context. The user context represents processes, address space, programs, user settings and configuration provided by the operating system for the current individual user. In this example, web browser 20 and Windows installer 26 execute within the user context. Memory 22 represents user address space and is accessible by, or mapped to, processes operating in the user context.

In contrast, system context represents the processes and address space associated with operating system 27 and is also referred to as kernel space. Access service 24 executes within the system context. Although described below in reference to a Windows™ operating system, operating system 27 may be any other operating system, such as the Mac™ OS operating system from Apple Computing or the Linux operating system. Although not shown in FIG. 2, client device 12A may comprise other components, such as one or more programmable processors, input/output (I/O) devices, and the like. Furthermore, memory 22 may comprise a computer-readable storage medium that stores executable software instructions. These instructions may cause the programmable processor to perform the principles of the invention as described herein.

Access control device 16 includes a number of components (not shown) for providing secure access to LAN 18. Access control device 16 provides web page 28, which represents a home page for the user upon successful authentication. In addition, access control device 18 includes (or provides access to) one or more software update packages that are required before the remote client device are allowed access to LAN 18. In this example, access control device 16 is shown having a Microsoft Installer package 30A ("MSI package 30A").

Initially, an administrator, such as administrator 19 of FIG. 1, may log into client device 12A and install access service 24. Access service 24 is a system-level software service (i.e., executes within the system context) that allows an enterprise enforce uniform security policies. Access service 24 may, for example, comprise a software suite that provides secure remote access services to client device 12A with respect to accessing an enterprise VPN, such as LAN 18 of FIG. 1, via access control device 16. Access service 24 may, for example, be a component with Juniper Networks unified access control solution.

Access service 24 may also be capable of loading and executing plug-in software modules, such as installer service 32. Installer service 32 is a system-level installation service and may comprise a plug-in, such as a dynamic link library (DLL) plug-in, capable of performing on-demand advertisement of MSI packages via interaction with Windows installer 26, which is a user-level installation service. As shown in FIG. 2, as a plug-in to access service 24, installer service 32 also executes at the system level, or within the system context, of operating system 27 executing on client device 12A.

Once access service 24 is installed, a remote user may log into client device 12A at the user-level, whereupon the remote user receives restricted privileges from operating system 27. The remote user may interact with client device 12A and initiate web browser 20 to access LAN 18 via a VPN. Web browser 20 may be, for example, one of an Internet Explorer, Mozilla Firefox, and Opera web browsers. To access LAN 18, the remote user directs web browser 20 to access control device 16, and in particular, directs web browser 20 to download web page 28 from access control device 16. Access control device 16 may require that the remote user log into the VPN and, upon authenticating the user, allows web browser 20 to download web page 28.

During this process, web browser 20 may download and execute an ActiveX module 34, or alternatively, if ActiveX module 34 is not installed, a java module, such as a java applet module. Regardless of the whether ActiveX or java is installed, module 34 represents wrapper technology encasing a setup module 36 that may be pre-installed or dynamically received from access control device 16 upon login by the user. Setup module 36 may comprise a dynamic link library ("dll") module that "plugs in to" ActiveX module 34 for execution by web browser 20.

Once the remote user is authenticated, setup module 36 may retrieve software package parameters 38, (e.g., a product name parameter 38A and version parameter 38B) from access control device 16 and determine whether installation of one or more software update packages, such as MSI package 30A, are required to access LAN 18 via the VPN. For example, setup module 36 may compare downloaded version parameter 38B to the version of software 31 currently installed within client device 12A. Product name parameter 38A may identify the software, such as software 31, upon which setup module 36 may identify the installed software perform the version comparison. If setup module 36 determines that version parameter 38B matches the version of installed software 31, setup module 36 performs no further operations, and web browser 20 may access LAN 18 via the VPN without installing MSI package 30A.

However, if setup module 36 determines that version parameter 38B does not match the version of installed software 31, setup module 36 downloads MSI package 30A and stores MSI package 30A to a storage location 23 that is accessible to all users, e.g., a share location on a disk or other storage medium. MSI package 30B, as shown in FIG. 2, represents the download and storage of MSI package 30A from access control device 16, and thus MSI package 30B is substantially similar to MSI package 30B.

Once downloaded and stored, setup module 36 informs installer service 32 of the location of MSI package 30B within the user context via a message 33. Setup module 36 may transmit a message 33 via a named pipe or any other form of inter-process communication to identify the name and location of MSI package 30B. Installer service 32 may then access and authenticate MSI package 30B to ensure that a trusted source composed MSI package 30B. This authentication procedure may comprise conventional digital signature checks, checksum verification, as well as other authentication techniques to ensure that MSI package 30B was not tampered with and represents a valid software update package.

Upon successful authentication of MSI package 30B, installer service 32 interacts with Windows installer 26 to advertise MSI package 30B from the user context. In some embodiments, installer service 32 interacts with a command line interface of Windows installer 26 referred to herein as "MSIexec." In these embodiments, installer service 32 may advertise MSI package 30B via a command 35 issued to the MSIexec command line interface of Windows installer 26.

Once advertised, installer service 32 informs setup module 36 that MSI package 30B has been successfully authenticated and advertised. As described above with respect to message 33, installer service 32 may communicate with setup module 36 via a message 37 over a named pipe or any other inter-process communication technique. Message 37 may contain, for example, a name or other identifier of MSI package 30B known to setup module 36.

Upon receiving message 37, setup module 36 interacts with Windows installer 26 to install MSI package 30B at the user level, or within the user context. Similar to installer service 32, setup module 36 may, in some embodiments, interact with Windows installer 26 via the command line interface referred to as MSIexec and may issue a command 39 to the MSIexec command line interface to initiate the installation. Upon receiving install command 39, Windows installer 26 installs MSI package 30B at the user level, thereby preserving user-specific installation details, such as Start menu settings in a Windows environment, configuration files, registry settings, and any user-specific network configuration details or remote access details. In this manner, the techniques of the invention provide on-demand advertisement of authorized software update packages with little or no administrative action and in a manner that preserves user-specific installation details.

Figure 3:
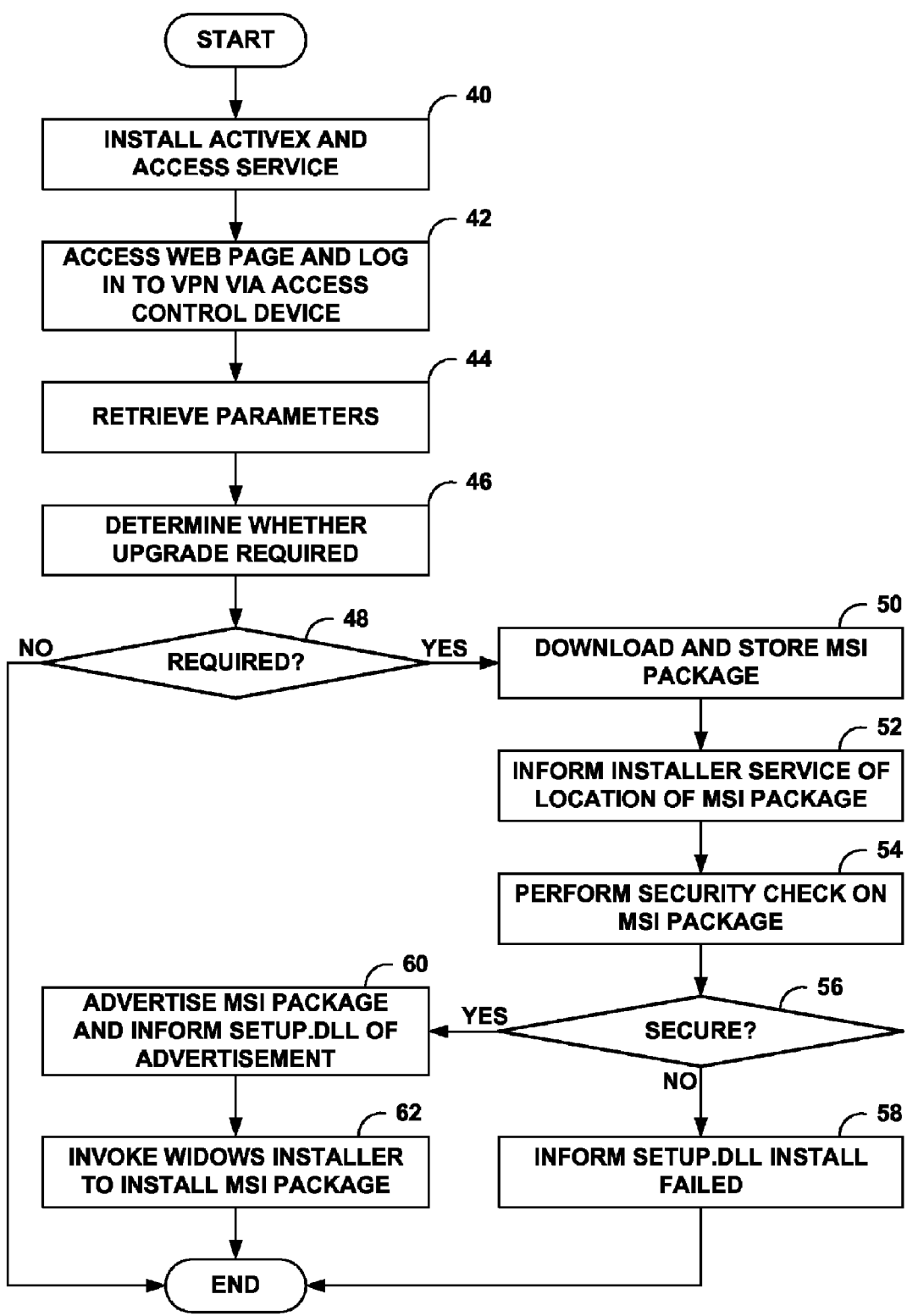
FIG. 3 is a flowchart illustrating exemplary operation of the client device and the access control device of FIG. 2 in performing on-demand advertising of software update packages.

FIG. 3 is a flow chart illustrating exemplary operation of client device 12A and access control device 16 of FIG. 2 in performing on-demand advertising of software update packages. While described in reference to FIG. 2, the principles of the invention may apply to any network system where software packages need be installed prior to accessing a restricted network, such as LAN 18, and the invention should not be limited strictly to the embodiment described herein.

Initially, as described above, an administrator installs ActiveX module 34 (or other wrapper technology), setup module 36, access service 24, and installer service 32 (40). Once the administrator installs the requisite software, the remote user may log into client device 12A, direct web browser 20 of client device 12A to access web page 28 stored on access control device 16, and log into the VPN via web page 28 of access control device 16 (42).

Once logged in, ActiveX module 34 automatically retrieves access control parameters 38 from web page 28 (44). Parameters 38 may comprise Common Gateway Interface (CGI) script parameters in the ActiveX context, or Java parameters in the Java context. Parameters 38 may, for example, specify a list of software applications (e.g., virus detection software) and corresponding versions that are required when remotely accessing enterprise LAN 18 via the VPN. As described above, setup module 36 inventories the software applications and versions currently installed on client device 12A and determines whether a software update package is required to access the VPN (46).

If all of the software applications specified by product name parameter 38A are installed on the client device and version parameter 38B matches the version of installed software 31, then no software update package is required and web browser 20 may access the VPN without going through the on-demand advertisement and installation process ("NO" 48). However, if one or more software applications are not installed or version parameter 38B does not match the version of software 31 installed on client device 12A, setup module 36 downloads and stores MSI package 30A as MSI package 30B shown within storage location 23 ("YES" 48, 50).

After storing MSI package 30A to storage location 23, setup module 36 communicates with installer service 32 executing at the system level via message 33 sent over named pipes or other inter-process communication techniques to inform installer service 32 of the location of MSI package 30B (e.g., a path and filename) and request authentication (52). In one embodiment, setup module 36 may not store MSI package 30A to a commonly accessible storage location 23, but instead stores the MSI package within a local directory or user memory space. In this embodiment, setup module 36 may send the contents of MSI package 30A in serialized fashion over the inter-process communication channel (e.g., message 33) to installer service 32. Installer service 32 recreates a local copy of MSI package 32 within the system context (e.g., its local directory or kernel space). This embodiment may be useful if client device 12A has no common location (e.g., directory) accessible by all users or in the event operating system 12A utilizes an encrypted file system (e.g., a file system where files are encrypted based on the user).

In either case, installer service 32 accesses MSI package 30B and performs a security check on MSI package 30B to authenticate the package and verify whether MSI package 30B was published by a trusted source (54). In this way, the circumvention of conventional advertising practices where the administrator must log into client device 12A to advertise MSI package 30B is limited only to secure packages from trusted sources. In other words, the techniques of the invention differ from conventional advertising practices by allowing on-demand installation of secure software update packages that are verifiably provided by trusted sources.

If installer service 32 determines that MSI package 30B is not secure, e.g., was not published by a trusted source, installer service 32 informs setup module 36 via message 37 that the advertisement of MSI package 30B failed, or more generally, that the install of MSI package 30B failed (58). If, however, installer service 32 determines that MSI package 30B is secure, e.g., published by a trusted source, installer service 32 executing with elevated privileges within the system level advertises the MSI package to Windows installer 26 executing within the user space. That is, installer service 32 executing within the system context invokes Windows Installer 26 to register MSI package 30B from the user context, thereby informing the with Windows operating system that MSI package 30B is authorized for subsequent installation on client device 12A. Installer service 32 may advertise MSI package 30B by issuing a command 35 to the MSIexec command line interface of Windows installer 26, for example, and informs setup module 36 of the advertisement, again, via a message 37 over a named pipe, for example (60). As one example, installer service 32 may issue an advertisement command 35 to the MSIexec command line interface according to the following syntax:

/j<u|m><Product.msi>[/t<Transform List>][/g<Language ID>], where "/j" specifies the advertising function, "<u|m>" specifies the scope of advertisement, "<Product.msi>" specifies the location of the software update package to advertise, "[/t<Transform List>]" specifies an optional transform to apply to the software update package, and "[/g<Language ID>]" specifies an optional language identifier.

Upon receiving notification of the advertisement, or message 37, setup module 36 invokes Windows installer 26 by issuing a command 39 to the MSIexec command line interface, for example, to install MSI package 30B (62). In other words, now that installer service 32 has informed the Windows installer 26 that MSI package 30B has been authenticated for subsequent client installation, setup module 36 triggers the installation. Setup module 36 may, for example, issue an install command 39 to the MSIexec command line interface according to the following syntax:

</package|/i><Product.msi>, where "</package|/i>" specifies the install operation and "<Product.msi>" specifies the location of the software update package to install. In this manner, a network system, such as network system 10 of FIG. 1, may advertise software update packages on-demand to facilitate installation of these software update packages with little to no administrator oversight, while also preserving user-specific installation details.

Various embodiments of the invention have been described. These and other embodiments are within the scope of the following claims.

The invention claimed is:

1. A method for installing a software update package on a computing device comprising:
   receiving, in a user context of an operating system executing on the computing device, parameters for the software update package for a user associated with the computing device, wherein the user context has a restricted privilege level within the computing device;
   determining, in the user context, whether to update software executing within the computing device based on the received parameters;
   automatically downloading the software package to the user context of the computing device based on the determination of whether to update the software executed within the computing device;
   automatically invoking a system-level installation service from the user context of the operating system of the computing device, wherein the system-level installation service executes within a system context of the operating system of the computing device, authenticates the software update package to ensure the software upgrade package is from a trusted source and, after authenticating the software update package, invokes a user-level installer service executing within the user context to advertise the software update package to the operating system from the user context so as to register the software update package with the operating system and enable subsequent installation of the software update package by the user; and after advertising the software update package, installing the software update package with the user-level installer service executing in the user context of the operation system.

2. The method of claim 1, further comprising accessing an access control device of a virtual private network (VPN) with the computing device, wherein the parameters are downloaded from the access control device, and wherein determining whether to update the software executing within the computing device comprises determining whether to update the software executing on the computing device based on parameters downloaded from the access control device.

3. The method of claim 2, wherein determining whether to update the software executing within the computing device comprises:

downloading product name and version parameters from the access control device;

comparing the downloaded product name and version parameters to the version of the software residing on the computing device; and determining to update the software residing on the computing device if the version of the software does not match the version parameter.

4. The method of claim 2, wherein automatically downloading the software update package comprises automatically downloading the software update package from the access control device based on the determination.

5. The method of claim 1, wherein advertising the software update package with the system-level installation service comprises advertising the software update package on-demand when needed by the user by performing a real-time determination of whether to update software installed on the computing device based on corporate policies, downloading the software update package, and advertising the software update package with no action by an administrator.

6. The method of claim 1, wherein authenticating the software update package comprises performing a security check with the system-level installation service to verify that the software update package was produced by a trusted source.

7. The method of claim 6, wherein advertising the software update package comprises advertising the software update package if the security check verifies that the software update package was produced by the trusted source.

8. The method of claim 1, wherein advertising the software update package further comprises advertising the software update package by interacting with a user-level Windows installer executing within the user context of the operating system through a MSIexec command line interface based on the authentication.

9. The method of claim 8, wherein advertising the software update package by interacting with the user-level Windows installer comprises advertising the software update package by issuing a command according to the following syntax to the MSIexec command line interface based on the authentication:

/j<u|m><Product.msi>[/t<Transform List>][/g<Language ID>]

where "/j" specifies the advertising function, "<u|m>" specifies the scope of the advertisement, "<Product.msi>" specifies the location of the software update package to advertise, "[/t<Transform List>]" specifies an optional transform list, and "[/g<Language ID>]" specifies an optional language identifier.

10. The method of claim 1, wherein installing the software update package comprises installing the software update package by interacting with the user-level installer service executing within the user context of the operating system through a command line interface after advertising the software update package to preserve user-specific installation details.

11. The method of claim 10, wherein installing the software update package further comprises installing the software update package by issuing a command according to the following syntax into the command line interface such that user-specific installation details are preserved:

</package|/i><Product.msi> where "</package|/i>" specifies the install operation and "<Product.msi>" specifies the location of the software update package to install.

12. The method of claim 1, wherein the software update package comprises a MSI package delineated by the ".msi" file extension.

13. A network system comprising:

an access control device that provides access to an enterprise network using a virtual private network (VPN) and includes software update package; and a client device that includes:

an operating system that maintains a user context for a user having restricted privileges and a system context having elevated privileges;

a user-level setup module executing within the user context that determines whether to update software residing on a client device based on at least one parameter downloaded from the access control device when the user has successfully logged into the VPN, and wherein the user-level setup module is configured to automatically download the software update package to the user context of the operating system from the access control device based on the determination; and a system-level installation service executing within the system context of the operating system that is automatically invoked from the user context of the operating system to authenticate the software update package to ensure the software upgrade package is from a trusted source; and a user-level installer service executing within the user context of the operating system that is invoked by the system-level installation service to advertise the software update package upon request by the system-level installation service by registering the software update package with the operating system to enable subsequent installation of the software update package by the user, wherein the user-level setup module is configured to direct the user-level installer service to install the authenticated software update package within the client device after the user-level installer service advertises the software update package.

14. The network system of claim 13, wherein the user-level setup module is configured to determine whether to update the software residing on the client device by:

downloading product name and version parameters from the access control device;

comparing the downloaded product name and version parameters to the version of the software residing on the client device; and determining to update the software residing on the client device if the version of the software does not match the version parameter.

15. The network system of claim 13, wherein the system-level installation service authenticates the software update package by performing a security check to verify that the software update package was produced by a trusted source.

16. The network system of claim 15, wherein the installer service advertises the software update package by advertising the software update package if the security check verifies that that the software update package was produced by the trusted source.

17. The network system of claim 13, wherein the system-level installation service advertises the software update package by advertising the software update package using a command line interface of the user-level installer service based on the authentication.

18. The network system of claim 17, wherein the system-level installation service advertises the software update package via the interactions by issuing a command according to the following syntax into the command line interface based on the authentication:

/j<u|m><Product.msi>[/t<Transform List>][/g<Language ID>], where "/j" specifies the advertising function, "<u|m>" specifies the scope of the advertisement, "<Product.msi>" specifies the location of the software update package to advertise, "[/t<Transform List>]" specifies an optional transform list, and "[/g<Language ID>]" specifies an optional language identifier.

19. The network system of claim 13, wherein the user-level setup module installs the authenticated software update package by installing the authenticated software update package through interactions with a MSIexec command line interface of a Windows installer after advertising the software update package.

20. The network system of claim 19, wherein the user-level setup module installs the authenticated software update package by issuing a command according to the following syntax into the MSIexec command line interface such that user-specific installation details are preserved:

</package|/i><Product.msi> where "</package|/i>" specifies the install operation and "<Product.msi>" specifies the location of the software update package to install.

21. The network system of claim 13, wherein the software update package comprises a MSI package delineated by the ".msi" file extension.

22. The network system of claim 13,
wherein the client device further comprises a system-level access service that executes within the system context, provides secure remote access services to the client device with respect to remotely accessing the enterprise network via the access control device, and loads plug-ins for execution on the client device, and
wherein the system-level installation service comprises a plug-in loaded by the access service from access control device.

23. The network system of claim 13, wherein the client device further comprises a user-level memory within the user context and accessible by the user-level setup module, wherein the user-level setup module stores the software update package to the user-level memory after downloading the software update package.

24. A device comprising:
a processor that executes an operating system that maintains a user context for a user having restricted privileges and a system context having elevated privileges;
a user-level setup module executing within the user context that determines whether to update software residing on the device when needed by the user device based on at least one parameter and automatically download a software update package to the user context of the operating system based on the determination; and
a system-level installation service executing within the system context and invoked by the user-level setup module to authenticate a software update package to ensure the software upgrade package is from a trusted source; and
a user-level installer service executing within the user context of the operating system that is invoked by the system-level installation service to advertise the software update package upon request by the system-level installation service so as to register the software update package with the operating system to enable subsequent installation of the software update package by the user,
wherein the user-level setup module is configured to direct the user-level installer service to install the authenticated software update package within the client device after the user-level installer service advertises the software update package.

25. A non-transitory computer-readable storage medium comprising instructions for causing a processor of a computing device to:
receive, in a user context of an operating system executing on the computing device, parameters for a software update package for a user associated with the computing device, wherein the user context has a restricted privilege level within the computing device;
determine, in the user context, whether to update software executing within the computing device based on the received parameters;
automatically download the software package to the user context of the computing device based on the determination of whether to update the software executed within the computing device;
automatically invoke a system-level installation service from the user context of the operating system of the computing device, wherein the system-level installation service executes within a system context of an operating system of the computing device, authenticates the software update package to ensure the software upgrade package is from a trusted source and, after authenticating the software update package, invokes a user-level installer service executing within the user context to advertise the software update package to the operating system from the user context so as to register the software update package with the operating system and enable subsequent installation of the software update package by the user; and
after advertising the software update package, install the software update package with the user-level installer service executing in the user context of the operation system.

* * * * *